Nov. 17, 1942.     C. F. SIMONDS     2,302,269
MOLDING MACHINE
Filed Nov. 23, 1940     2 Sheets-Sheet 1
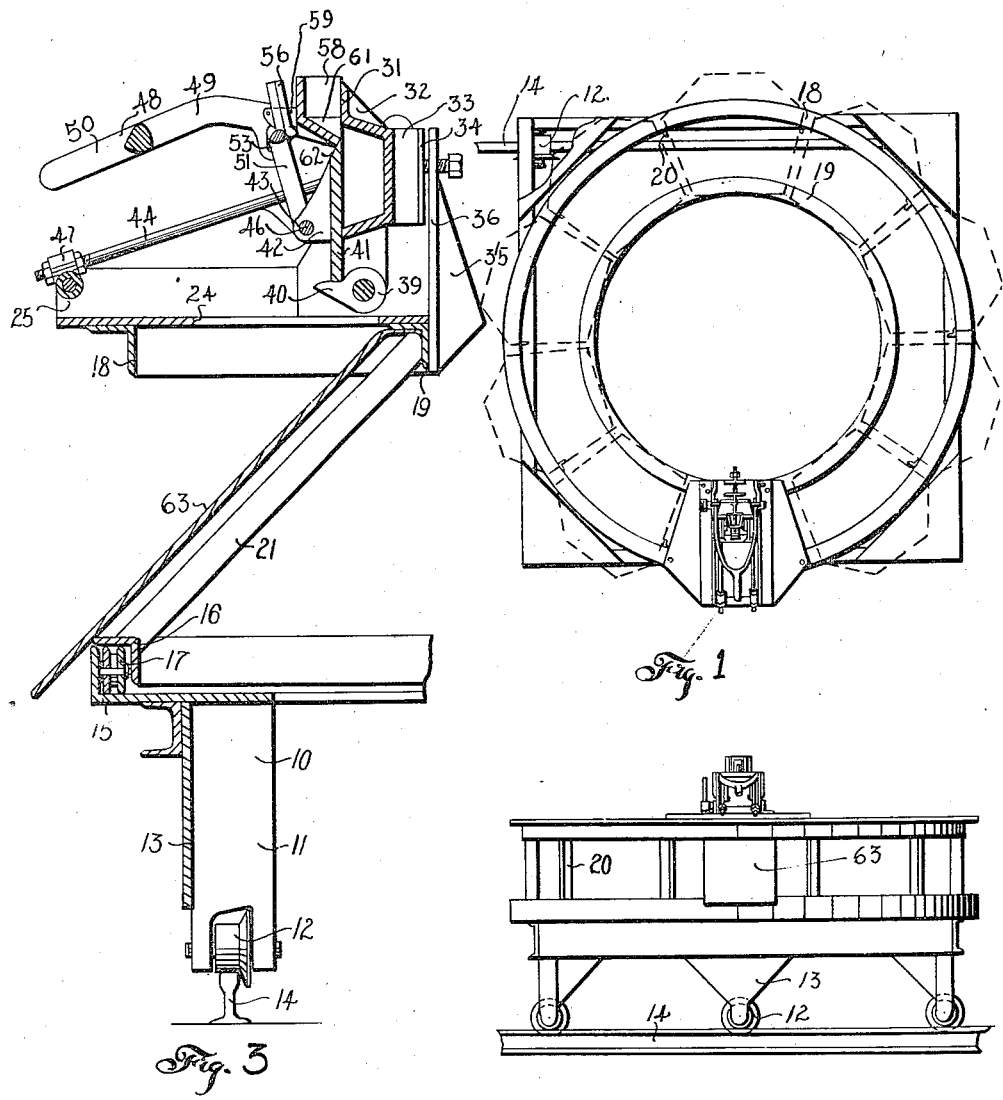
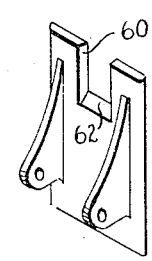
Inventor
Chester F. Simonds
By Jack A. Ohley
Attorney Nov. 17, 1942. C. F. SIMONDS 2,302,269
MOLDING MACHINE
Filed Nov. 23, 1940 2 Sheets-Sheet 2
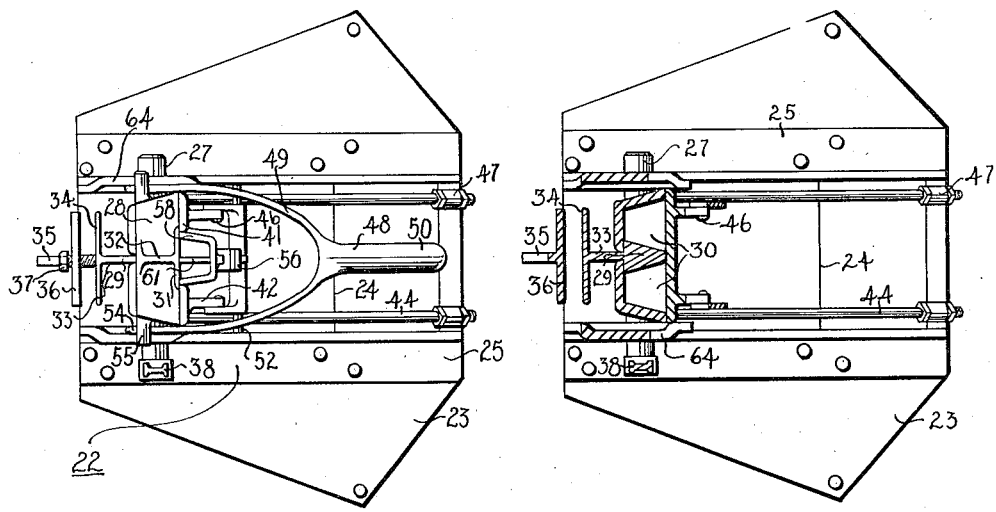
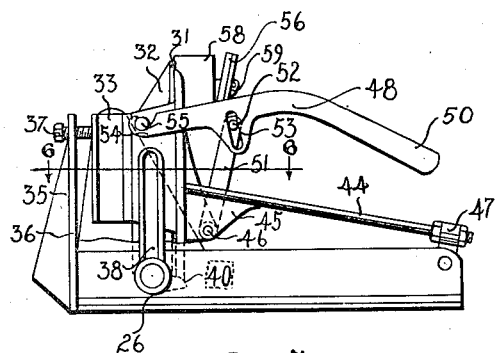
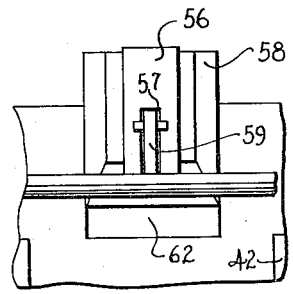
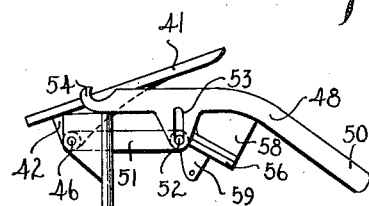
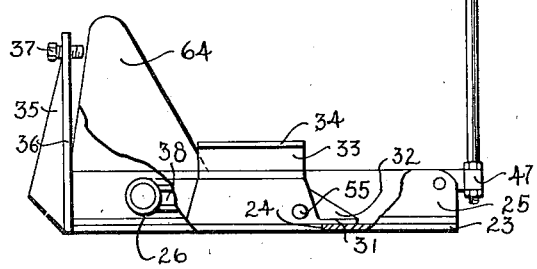
Inventor
Chester F. Simonds
By Jack A. Ashley
Attorney Patented Nov. 17, 1942

2,302,269

UNITED STATES PATENT OFFICE 2,302,269

MOLDING MACHINE

Chester F. Simonds, Houston, Tex.

Application November 23, 1940, Serial No. 366,842

7 Claims. (Cl. 22—63)

This invention relates to new and useful improvements in molding machines.

Heretofore, it has been the practice to cast ingots of metal and other substances in a mold which is open at its upper end. It is not possible for the workman to fill each mold to exactly the same level each time. Therefore the finished ingots differ slightly in weight.

In many instances, the metal, or other substance, is sold by the ingot instead of by the pound. This procedure is based on the assumption that each ingot weighs a specified amount. If the ingots are slightly over or under weight, there is a discrepancy in the amount of metal, or other substance, paid for and the amount received.

In the objects and specification which follow and the claims attached hereto, the term "metal" will be, for simplicity, used to designate metal or any other substance which is adapted to be molded and utilized in the form of ingots.

It is, therefore, an important object of this invention to provide an improved molding machine which produces ingots of metal which are of uniform weight.

Another object of the invention is to provide an improved molding machine wherein the metal is poured into the mold and allowed to solidify and then cut to the proper weight.

A further object of the invention is to provide an improved molding machine wherein the molds form a closed circuit and are in substantially continuous operation; the molds being filled and emptied in rotation so that at any one moment some of the molds are being filled while others are being emptied so as to be filled again.

Still another object of the invention is to provide an improved molding device which is semi-automatic in its operation, yet may be operated partially by hand-power so that the machine accommodates itself to the speed and efficiency of the workmen operating it.

A still further object of the invention is to provide an improved molding machine wherein the opening into the mold through which the liquefied metal is poured may be adjusted in cross-sectional area, so as to prevent liquefied metal from solidifying in the opening to such an extent that the opening is blocked.

A further object of the invention is to provide an improved molding machine wherein the solidified ingot is cut to the proper size and weight while the ingot is still in the mold and before it has been removed therefrom.

A construction designed to carry out the invention will be hereinafter described, together with other features of the invention.

The invention will be more readily understood from a reading of the following specification and by reference to the accompanying drawings, in which an example of the invention is shown, and wherein:

Figure 1 is a plan view of a molding machine, constructed in accordance with the invention, and showing one of the molding units in position upon the machine, Figure 2 is an elevation taken at right angles to Figure 1, Figure 3 is an enlarged vertical cross-sectional view taken through the molding unit, Figure 4 is an enlarged plan view of one of the molding units, Figure 5 is an enlarged elevation of the molding unit taken at right angles to Figure 4, Figure 6 is a horizontal cross-sectional view taken on the line 6—6 of Figure 5, Figure 7 is a view similar to Figure 5, and showing the molding unit in an opened position, Figure 8 is a further enlarged view of the funnel arrangement, Figure 9 is an isometric view of the front half of the mold, showing the cutter blade, and Figure 10 is an isometric view of one of the finished ingots.

In the drawings, the numeral 10 designates a supporting frame, having depending legs 11 carrying flanged wheels 12. The legs 11 are suitably braced by triangular-shaped plates 13 which are attached to the frame and the legs, and the latter are placed in horizontal alinement along each side of said frame. The flanged wheels 12 engage a pair of tracks 14 so as to support the frame 10 upon said tracks and allow the frame to be moved therealong.

An angle bar 15, in the shape of a circle, is secured in a horizontal plane by any suitable means to the upper side of the frame 10. The bar 15 forms a track for a second angle bar 16, which is formed in the shape of a circle and is disposed in a horizontal plane above the bar 15. The bar 16 carries rollers 17 about its periphery, said rollers being mounted within the angle of the bar 16 and engaging within the angle of the bar 15, so that the bar 16 is rotatably mounted upon the bar 15 and the frame 10.

A circular frame is disposed above the bar 16 and comprises a circular outer frame bar 18, similar to the bar 16 and positioned in vertical alinement therewith, and a smaller circular inner frame bar 19 positioned concentrically of the frame bar 18 and spaced inwardly therefrom. The frame bars 18 and 19 are secured to and spaced from the bar 16 by vertical bracing members 20 and diagonal bracing members 21 (as is shown in Figures 1, 2 and 3 of the drawings).

With the structure set forth hereinbefore, there is provided a supporting member or frame for the molding units to be described hereinafter. The outer and inner frame bars, 18 and 19, respectively, form a table to support the units. With the units mounted in this manner, they may be moved in a circular fashion about the frame 10, and may be moved longitudinally with respect to the tracks 14.

For the sake of simplicity, only one of the molding units is shown in the drawings (Figures 1 and 2) as being mounted on the bars 18 and 19, and this unit is designated by the numeral 22. However, in actual practice any desirable number of units 22 would be secured, in radial fashion, to the bars 18 and 19. The location of these units is indicated by dotted lines in Figure 1 of the drawings. Obviously, the number of the units so placed is limited only by size of the supporting frame formed by members 18 and 19.

The molding unit 22 is provided with a base plate 23, which is substantially trapezoidal in shape and is secured to the outer and inner frame bars 18 and 19 so as to overlie a radial segment of the area defined by the two bars. The plate 23 is provided with a central rectangular opening 24 and a pair of angle bars 25 are secured to the plate along opposite sides of the opening 24. The bars 25 are parallel to one another and to that radius of the frame bar 18 which passes through the center of the base plate.

A circular opening 26 extends transversely of the upstanding web of each of the bars 25 at a point near the inner ends of the bars and an axle 27 is positioned within said openings. The axle is free to rotate within the openings and carries a matrix 28. The matrix is divided by a vertical partition 29 into two vertical compartments 30 which are adapted to receive the molten metal to be molded. The matrix 28 and the compartments 30 are shown in the drawings as being designed to mold an ingot having the shape of a truncated rectangular pyramid, as shown in Figure 10. Obviously, the matrix may be altered to produce ingots of various shapes without departing from the teaching of this invention.

The matrix 28 is free to swing about the axle 27, and is provided at its upper end with an upwardly extending plate 31, which is substantially in vertical alinement with the open side of the matrix. A reinforcing web 32 extends from the inner face of the plate 31 to the upper end of the matrix. A vertical fin 33 projects rearwardly from the back wall of the matrix, and carries a vertical plate 34, the function of which will be explained hereinafter. A similar plate 35 extends upwardly from the base plate 23 at a point spaced a short distance behind the plate 34, and is stiffened and supported by a reinforcing web 36 which projects from its back side.

A screw-threaded bolt 37 extends through the upper end of the plate 35 so as to have its inner end engage the plate 34. Rotation of the bolt will cause it to move inwardly and outwardly with respect to the plate 35, and thus alter the space between said plate and the plate 34. Since the plate 35 is secured to the base plate 23, this operation will cause the plate 34 and the matrix 28 to assume various angles with respect to the base plate.

A lever 38 is secured to one end of the axle 27 which projects through one of the bars 25, and a cam wheel 39 having a forwardly projecting finger 40 is secured near the middle portion of the axle.

A cover plate 41 is provided to form the front half of the mold. The cover plate 41 is formed with a pair of forwardly extending vertical fins 42 on its outer side, and each of the fins carries a transverse opening 43. A pair of elongated rods 44 are secured to the outer side of the cover plate 41, one at either side, by means of depending webs 45 which are connected to the fins 42 by pins 46 which engage in the openings 43. Each of the rods 44 has its outer end pivoted to the outer end of one of the bars 25 by an adjustable connection 47, whereby the radius of swing of the cover plate may be varied.

A locking member 48, in the form of a yoke 49 having an outwardly extending handle 50, is secured to the unit by links 51 which extend upwardly from the pins 46. The upper ends of the links 51 are connected to the yoke 49 by means of a rod 52 which extends through slots 53 formed in the branches of the yoke. The yoke 49 straddles the matrix 28 and the cover plate 41 so as to have its inner ends on either side of the matrix. The inner ends are provided with hooks 54 which face upwardly and engage laterally extending ears 55 formed on the matrix.

The slots 53 are inclined slightly from the vertical toward the matrix so that downward motion of the handle will cause the rod 52 to move inwardly toward the cover plate. In this manner the inclined slots may be utilized to force the cover plate into snug engagement with the matrix.

A finger 56 extends upwardly from the rod 52 and carries a vertical slot 57. A funnel 58 is provided with an outwardly extending fin 59, and the fin is loosely pinned within the slot 57. In this manner, the funnel is supported by the finger 56, but is free to move in several directions.

The funnel 58 may be of any desirable construction, and is provided with an open side which abuts the upstanding plate 31 formed on the matrix. The plate 31 forms one wall of the funnel. The funnel communicates with the compartments 30 through a rectangular notch 60 cut in the upper end of the cover plate 41. A vertical baffle 61 is provided in the funnel so as to split the stream of liquified metal flowing therethrough, and deliver a portion of the stream into each of the compartments 30.

The lower edge of the notch 60 is formed as a knife-edge 62, and the cover plate overlies the finger 40 formed on the cam wheel 39. With this arrangement movement of the lever 38 will cause the cam wheel to rotate, lifting the finger 40 into engagement with the lower edge of the cover plate. Further rotation of the cam wheel by the lever will cause the cover plate to be lifted so that the knife-edge 62 will shear off the sprue of metal extending up into the funnel. This action cuts the ingots within the compartments 30 to the exact size and weight desired so that no further trimming is necessary.

After this shearing operation, the handle 50 is lifted so that the yoke 49 is unlatched and the cover plate may be swung on the rods 44 out of engagement with the matrix 28. This allows the matrix to fall forward so that the upstanding plate 31 strikes the base plate 23, knocking the finished ingots out of the matrix and down through the opening 24 provided in the base plate. The ingots fall through the opening onto a suitable chute 63 positioned therebelow.

At the same time that this operation is taking place, the sprue of metal which has been sheared off may be removed from the funnel by hand so that the unit is free to receive another charge of metal. Then the matrix is swung back to a vertical position and the cover plate clamped into position by the yoke 49. It is pointed out that the lower end of the finger 56 will bear against the funnel so that downward movement of the yoke 49 by the handle 50 will press the funnel into snug engagement with the matrix. A few downward taps on the funnel will cause the knife-edge 62 to function as a wedge so that the cover plate will be forced into snug engagement with the matrix. The mold is then ready to receive another batch of liquefied metal. The complete operation of emptying the molding unit and preparing it for another charge of metal requires less than a minute, so that the unit is quick and efficient to operate.

As stated hereinbefore, the units are adapted to be mounted next to each other, and for this reason a triangularly-shaped guard plate 64 extends upwardly from the base plate 23 at either side of the matrix 28.

This molding machine with the molding units mounted in a circle upon the frame bars 18 and 19 is designed to be used in close proximity to a source of liquefied metal. One workman fills the empty molds with metal, and rotates the table formed by the bars 18 and 19 about the frame 10. Another workman stands at a point farther around the machine so that when the molding units reach a point in front of him, the metal contained therein has solidified sufficiently to be removed from the mold. The latter workman removes the molded ingots in the manner set out hereinabove, and clamps the mold back together so as to receive another charge of metal. In this manner the machine is in continuous operation, the molds being filled and emptied as fast as the metal will solidify. Whenever desired, the machine may be moved out of the way by rolling it upon the tracks 14.

The adjusting bolt 37, as heretofore stated, is utilized to adjust the angle between the matrix and the base plate. Obviously, swinging the matrix farther toward the plate 35 will cause more of the compartments 30 to be exposed to the funnel and the notch 60. Conversely, swinging the matrix away from the plate 35 by screwing the bolt toward the matrix will cause less of the compartments to be exposed to the funnel and the notch. The ability to change the size of this opening is desirable in that it allows the operator to adjust the unit to a point where the opening is not so small that the metal solidifies therein, and not so large that it is difficult to shear off the sprue of metal in the funnel. This is a desirable feature of the invention.

Various changes, alterations and modifications may be made in the size, shape and arrangement of the herein described elements within the scope of the appended claims.

What I claim and desire to secure by Letters Patent is:

1. A molding unit including, a matrix, a cover member adapted to cooperate with the matrix to form a substantially closed mold, means for introducing metal into the mold from the side to form an ingot, and means for shearing from the side all excess metal from the ingot while the latter is still in the mold so that a finished ingot is produced directly from the mold.

2. A molding unit including, a matrix, a cover member adapted to cooperate with the matrix to form a mold, means for introducing metal into the mold from the side to form an ingot, and shearing means forming a part of the cover member for shearing from the side all excess metal from the ingot while the latter is still in the mold so that a finished ingot is produced directly from the mold.

3. The combination to form a molding machine, of a table rotatably supported upon a frame, with a molding unit mounted upon the table and including, a matrix, a cover member adapted to cooperate with the matrix to form a mold, means for introducing metal into the mold from the side to form an ingot, and means for shearing from the side all excess metal from the ingot while the latter is still in the mold and substantially simultaneously with the removal thereof so that a finished ingot is produced directly from the mold.

4. The combination to form a molding machine, of a table rotatably supported upon a frame, with a molding unit mounted upon the table and including, a matrix, a cover member adapted to cooperate with the matrix to form a mold, means for introducing metal into the mold from the side to form an ingot, and means forming a part of the cover member for shearing from the side all excess metal from the ingot while the latter is still in the mold and substantially simultaneously with the removal thereof so that a finished ingot is produced directly from the mold.

5. A molding unit including, a matrix, a cover member adapted to cooperate with the matrix to form a substantially enclosed mold from the side, means for introducing metal into the mold to form an ingot, and means for shearing from the side all excess metal from the ingot substantially simultaneously with the removal thereof while the latter is still in the mold so that a finished ingot is produced directly from the mold.

6. A molding unit including, a mold having one side open and being pivoted upon a frame, a cover member adapted to close the open side of the mold and having an opening to allow the entry of metal into the mold, and a funnel member carried by a latch member and adapted to be swung into registry with the opening of the cover member as the latch member is brought against the cover member so as to secure the same and the mold into an upright position, the latch member and cover member being releasable so that the mold may be pivoted to dump a molded ingot therefrom.

7. A molding unit including, a mold having one side open and being pivoted upon a frame, a cover member adapted to close the open side of the mold and having an opening to allow the entry of metal into the mold, a funnel member carried by a latch member and adapted to be swung into registry with the opening of the cover member as the latch member is brought against the cover member so as to secure the same and the mold into an upright position, the latch member and cover member being releasable so that the mold may be pivoted to dump a molded ingot therefrom, and shearing means carried by the cover member for shearing excess metal from the molded ingot prior to the removal therefrom from the mold.

CHESTER F. SIMONDS.